July 28, 1936.  W. F. HEINEMAN  2,048,864

VALVE

Filed May 13, 1935

INVENTOR.
Warren F. Heineman
BY
Arthur R. Woolfork
ATTORNEY.

Patented July 28, 1936

2,048,864

UNITED STATES PATENT OFFICE 2,048,864

VALVE

Warren F. Heineman, Shorewood, Wis.

Application May 13, 1935, Serial No. 21,155

7 Claims. (Cl. 251—27)

This invention relates to valves, faucets, and the like.

It is a well known fact that valves are subject to considerable wear and rapidly deteriorate in use, frequently leaking soon after they have been repaired. This effect is due to several causes among which it may be noted is the fact that it is customary to provide a composition valve which is forced against an unyielding seat, frequently resulting in cutting the valve or providing roughnesses therein through which tiny leaks will rapidly form. Additionally, if the valve is used in a hot water line, there is, after the valve is closed, a subsequent contraction of the parts due to cooling of the parts and leaking very frequently occurs from this cause.

It is also well known that where a leak starts at a composition valve, that it rapidly forms a larger channel through the composition of which the valve is formed and the leak increases rapidly.

This invention is designed to overcome the above noted defects, and objects of this invention are to provide a novel form of valve or faucet which is so made that perfect seating is obtained throughout an extremely long life of the valve and even when the valve is used in a hot water line, for example, with alternate heating and cooling of the valve, so that subsequent contraction of the parts of the faucet or valve is taken care of in a novel manner to avoid leaking which heretofore has frequently been present due to this cause.

In greater detail, objects of this invention are to provide a valve construction in which a relatively springy conical valve is employed in conjunction with threads in which the female portion is materiallly larger than the male portion, thus allowing axial motion of the valve spindle so that the valve will be seated by water pressure and still a fraction of a turn will be permitted, thereby allowing a polishing or grinding action of the valve against the valve seat on the one hand, by the slight turning of the valve after it has seated and, on the other hand, assuring the conforming of the valve to the valve seat due to the water pressure holding it in place, the valve being so constructed, however, that pressure can be applied between the valve and valve seat by means of the threads themselves.

It is well known that valves or faucets are frequently noisy and sing during the time the water is flowing. This invention is designed to provide a valve or faucet which is silent and which is free from any whistle or sing, the construction being such that there is no chance of the whistle being formed in the hollow conical shaped valve, as this portion of the valve is moved out from the extremely rapidly flowing constricted portion of the stream of water and is in a comparatively quiet water zone.

Embodiments of the invention are shown in the accompanying drawing, in which.

Figure 1:
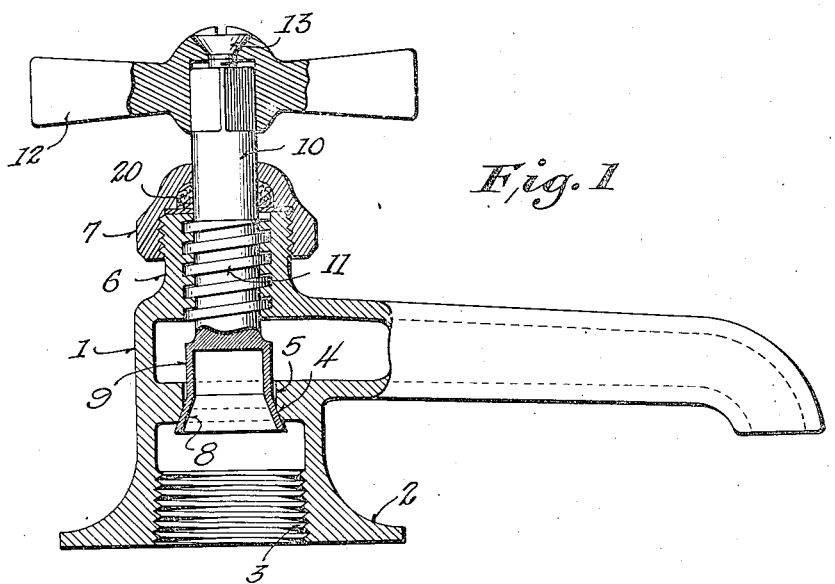
Figure 1 is a sectional view through one form of faucet.

Referring to Figure 1, it will be seen that the valve comprises a body portion 1 which may be of any of the usual types. In the form shown, it is provided with an integral lower flange 2 adapted to be screwed down against the basin or sink or other member when the supply pipe is screwed into the threaded portion 3 of the body.

The body portion is provided with a valve seat 4 which has a conical portion and above which there is a cylindrical portion 5. The upper portion of the body part is provided with an internally threaded neck 6 which receives the cap 7. Packing may or may not be employed and may be positioned in the usual manner beneath the cap 7 and compressed against the stem of the faucet.

The valve proper consists of a conical member 8 which contracts upwardly and which ends in a cylindrical portion 9. This portion is integral with the valve stem 10 and threads 11 are formed on the stem and may cooperate with the threaded neck of the body part. The upper end of the stem is squared to receive the handle 12 locked in place by the screw 13 in the usual manner.

The body portion of the faucet may be formed of common brass. It is preferable, however, to form the valve portion 8 of a high grade, relatively tough bronze, such, for instance, as Tobin bronze. Very obviously other metals could be used, such as stainless steel, for instance, or any other suitable material. In fact, the entire device could be made of non-corrosive material, if so desired.

It is to be noted particularly that in the form shown in Figure 1 the valve proper is bell like or conical and is relatively thin and springy. The thickness of the parts for the valve shown in the drawing is exaggerated for the sake of clearness, the valve really being in practice formed considerably thinner than is practical to show in the drawing.

In making this faucet the female portion of the threads is formed larger than the male portion thereof, thus allowing an axial and lateral motion of the valve and valve stem. When the valve is being closed, it is apparent that the water pressure below the valve will cause it to seat before pressure is actually applied to the valve due to the action of the threads. Thus after seating has occurred, the valve may be given a further partial rotation due to the construction of threads hereinbefore described, and consequently a polishing or grinding action will take place.

Further than this, the springy nature of the valve and the pressure of the water below the valve causes the valve to conform accurately to the seat. A very important result of the construction is that even when the parts contract or vary due to changes in temperature, as for instance when the valve is used on a hot water line, the water pressure will still hold the valve seated although a difference in contraction of the parts may exist. Thus no leaking will occur. As a matter of fact, there is a camming action between the conical seat and the conical valve and the springy nature of the valve with the water pressure below it insures accurate conforming of the valve to the seat.

Further than this, it is obvious that the valve can be made of different thicknesses for different water pressures. In all events, the thickness of the valve is preferably such that it cannot be damaged due to force placed thereon due to the action of the threads.

In actual practice it is found advantageous to have fairly steep threads, for instance as shown in the drawing and as an example to provide, for instance, 1/64" thickness in the groove or female portion over and above the thickness of the actual thread or rib of the stem for an eight pitch thread. In the particular form shown this allows approximately a 45° rotation of the handle after the valve has first been seated by water pressure before pressure is applied to the valve due to the action of the threads. This example, however, is to be understood merely as illustrative and in no sense limiting.

Another important feature of this invention is the absence of whistle or sing when the faucet is turned on. It has been found that the sing occurs due to the extremely rapidly moving constricted portion of the water stream when this constricted portion is adjacent the edge of the valve. The edge of the valve is shifted downwardly, as is apparent from the drawing, so that it is not at the constricted portion through which the water flows between the valve and the seat. It is in a relatively quieter zone. The extremely rapidly flowing water passes between the seat and the upper portion of the outer conical surface of the valve and between the seat and the cylindrical portion 9 of the valve. It has been found that this construction wholly avoids any tendency to whistle or sing.

Figure 2:
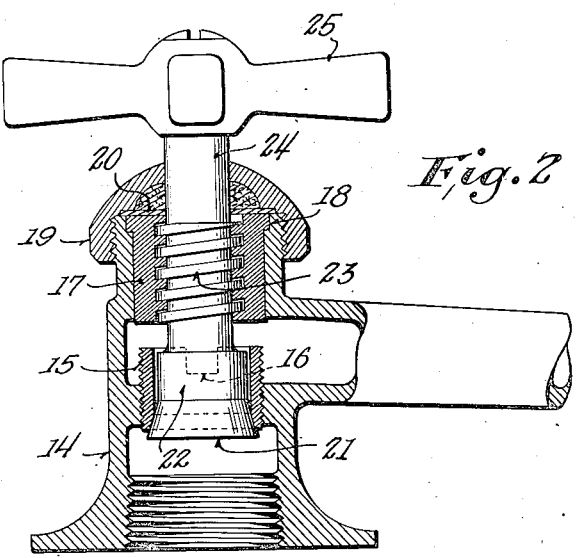
Figure 2 is a view corresponding to Figure 1, with parts broken away, showing a further form of faucet.

It is obvious that the faucet can take many other forms. For example, if it is desired to provide a construction in which the valve may be renewed or replaced without removing the faucet from the pipe, the form shown in Figure 2 may be used.

In this form of the invention the body portion 14 is provided with a removable valve seat 15 which is a sleeve provided with a bevelled lower end and with notches 16 adapted to receive a suitable tool for initially screwing the sleeve in place or for removing it. The neck of the valve is provided with a removable internally threaded sleeve 17 which has a flange or shouldered portion 18 fitting within a correspondingly recessed or shouldered portion of the neck of the body part. This member 17 is held in place by means of the cap 19. If desired, the faucets may be provided with an upper gasket or washer 20 or packing may be placed beneath the cap in the usual manner.

The valve proper is provided, as previously described, with the conical portion 21 and the cylindrical upper portion 22. It is hollow and is springy, identically as described in connection with Figure 1. The threads 23 formed on the stem 24 fit within the threads in the member 17, the clearance between the male and female portion of the threads being as heretofore described. A suitable handle 25 is provided.

It is preferable to form the valve portion of the spigot integral with the stem, as has been shown, though it is within the province of this invention to form it of a separate and distinct member secured to the stem, if so desired.

Also it is to be clearly understood that other materials than those described may be employed. For example, the bushing or removable seat 15 may be formed of a higher grade material than the body portion 14, or other combinations of materials can be employed.

Further it is to be noted that by having the valve relatively springy and with an open bottom portion located within the inlet portion, that the pressure of the water in the inlet portion assists in maintaining the valve firmly seated when the valve is closed.

In actual tests a valve constructed in accordance with this invention was operated for 500,000 cycles and showed scarcely any wear. It seated easily and without leaking even after this prolonged service. This test, of course, was made by employing an automatic machine to manipulate the valve this large number of times. In actual service one of these valves was placed on a hot water line for a considerable length of time and did not develop any leak whatsoever.

The conical portion of the valve has a gradual taper and a very small axial force due either to the pull of the threads or to water pressure will produce a considerably larger lateral pressure and thus assist in causing the conical portion to conform itself to the seat. It is to be noted particularly that this axial force may be produced by the threads alone, on the one hand, or may be produced, on the other hand, by the water pressure acting below the valve and, in addition, may be produced jointly by both these forces.

As an illustration, it is to be noted that the conical portion is made relatively thin; for example from .020" to .025" wall thickness for ordinary water pressure has been found sufficient, and with this relatively thin conical portion relative distortion can occur without producing permanent deformation of the valve. If there is, for example, a slightly oval shape for the valve seat through inaccuracies in manufacture or distortion by heat, the thin walled conical portion will still conform itself accurately to the seat and thus produce a perfect seal.

Additionally it is to be noted that the internal conical portion of the valve seat is engaged by the external surface of the conical valve and thus a surface contact is provided as distinguished from a line contact. Obviously, therefore, relative rotation of the valve with respect to the valve seat will not produce any cutting or any formation of ring grooves or spiral grooves on the valve, but will, in reality, polish and grind the conical valve member and seat at each operation.

It has been found also that these valves are extremely quiet in operation and are free from any sing or whistle.

While the expressions "upwardly" and "downwardly" have been used in describing and claiming the invention, it is to be distinctly understood that these expressions are used merely to simplify the wording and are not to be construed in any sense as limiting as the valve may obviously occupy any position whatsoever.

Although this invention has been described in considerable detail, it is to be understood that such description is intended as illustrative rather than limiting, as the invention may be variously embodied and is to be interpreted as claimed.

I claim:

1. A valve construction comprising a body portion having an inlet and an outlet portion and an intermediate valve seat, said valve seat being removable from said body portion, said body portion having a neck through which said valve seat may be passed and having an internally threaded bushing normally located within said neck, a cap for holding said bushing in place, and a combined valve stem and valve, said valve stem having a threaded portion cooperating with the threads of said bushing and said valve having at least a portion formed in the shape of a hollow, downwardly opening member and having a substantially cylindrical upper portion located in both open and closed positions within said valve seat.

2. A valve comprising a body portion having an inlet portion adapted to receive fluid under pressure and an outlet portion and having a truncated conical valve seat intermediate said inlet and outlet portions with the larger portion of the cone directed towards the inlet portion, a valve stem, a threaded connection between the stem and body portion and the threads of said connection having clearance to allow axial motion of the stem without rotation, and a valve member carried by the inner end of the stem, said valve member having a thin-walled, hollow truncated conical portion with its larger end opening into the inlet portion and having a cylindrical portion extending from the smaller end of the truncated portion towards the stem, said conical portion being flexible and freely conforming itself to the seat, said cylindrical portion rigidly connecting said stem and the conical portion of said valve, said cylindrical portion being of smaller diameter than the internal diameter of the seat to provide a restricted annular area between said seat and said cylindrical portion, said conical portion when said valve is being closed first seating with a surface contact within the conical valve seat by fluid pressure and being rotated by said stem before the threads exert a closing force on said valve member, whereby a grinding and polishing action occurs between said valve member and said seat.

3. A valve comprising a body portion having an inlet portion adapted to receive fluid under pressure and an outlet portion and having a truncated conical valve seat intermediate said inlet and outlet portions with the larger portion of the cone directed towards the inlet portion, a valve stem having threaded engagement with the body portion and the threads having clearance to allow axial and lateral motion of the stem without rotation, and a valve member carried by the inner end of the stem, said valve member having a thin-walled, hollow truncated conical portion with its larger end opening into the inlet portion and having a cylindrical portion extending from the smaller end of the truncated portion towards the stem, said conical portion being flexible and freely conforming itself to the seat and having a relatively small taper whereby a small axially applied force will produce a relatively greater lateral force on the surface of the conical portion as it engages the seat, said cylindrical portion rigidly connecting said stem and the conical portion of said valve, said cylindrical portion being of smaller diameter than the internal diameter of the seat to provide a restricted annular area between said seat and said cylindrical portion, said conical portion when said valve is being closed first seating with a surface contact within the conical valve seat by fluid pressure and being rotated by said stem before the threads exert a closing force on said valve member, whereby a grinding and polishing action occurs between said valve member and said seat.

4. A valve comprising a body portion having an inlet portion adapted to receive fluid under pressure and an outlet portion and having a truncated conical valve seat intermediate said inlet and outlet portions with the larger portion of the cone directed towards the inlet portion, a valve stem having threaded engagement with the body portion and the threads having clearance to allow axial and lateral motion of the stem without rotation, and a valve member carried by the inner end of the stem, said valve having a thin-walled, hollow truncated conical portion with its larger end opening into the inlet portion and having a hollow cylindrical portion extending from the smaller end of the truncated portion towards the stem, said conical portion being flexible and freely conforming itself to the seat, said cylindrical portion rigidly connecting said stem and the conical portion of said valve, said cylindrical portion being of smaller diameter than the internal diameter of the seat to provide a restricted annular area between said seat and said cylindrical portion, said conical portion when said valve is being closed first seating with a surface contact within the conical valve seat by fluid pressure and being rotated by said stem before the threads exert a closing force on said valve member, whereby a grinding and polishing action occurs between said valve member and said seat.

5. A valve comprising a body portion having an inlet portion adapted to receive pressure fluid and having an outlet portion and having a valve seat between the inlet and outlet portions, said valve seat having a truncated conical portion with the larger part opening into the inlet portion and having a cylindrical portion extending from the smaller part of the conical portion and opening into the outlet portion, a valve stem having threaded engagement with said body portion consisting of square threads having axial and lateral clearance, and a valve member carried by the inner end of said stem, said valve member having a thin-walled, hollow truncated conical portion for fitting within the conical portion of said seat with the larger part opening into said inlet portion and having a hollow cylindrical portion opening into the conical portion of said valve and rigidly joining said stem and the conical portion of said valve, said conical portion being flexible and freely conforming itself to the seat, said cylindrical portion being of smaller diameter than said seat to provide a restricted annular area between said seat and said cylindrical portion, said cylindrical portion remaining within said seat in all positions assumed by said valve and limiting the fluid flow around the cylindrical portion when said valve is open and the free edge of the conical portion of said valve adapted to be spaced a material distance from said valve seat when the valve is open, whereby whistling is avoided, said valve during closing being first seated by fluid pressure and thereafter being rotated by said stem before the threads exert a closing force on said valve member, whereby a grinding and polishing action occurs between said valve member and said seat.

6. A valve comprising a body portion having an inlet portion adapted to receive pressure fluid and having an outlet portion and having a valve seat between the inlet and outlet portions, said valve seat having a truncated conical portion with the larger part opening into the inlet portion and having a cylindrical portion extending from the smaller part of the conical portion and opening into the outlet portion, a valve stem having threaded engagement directly with said body portion consisting of square threads having axial and lateral clearance, and a valve member carried by the inner end of said stem, said valve member having a thin-walled, hollow truncated conical portion for fitting within the conical portion of said seat with the larger part opening into said inlet portion and having a hollow cylindrical portion opening into the conical portion of said valve and rigidly joining said stem and the conical portion of said valve, said conical portion being flexible and freely conforming itself to the seat, said cylindrical portion being of smaller diameter than said seat to provide a restricted annular area between said seat and said cylindrical portion, said cylindrical portion remaining within said seat in all positions assumed by said valve and limiting the fluid flow around the cylindrical portion when said valve is open and the free edge of the conical portion of said valve adapted to be spaced a material distance from said valve seat when the valve is open, whereby whistling is avoided, said valve during closing being first seated by fluid pressure and thereafter being rotated by said stem before the threads exert a closing force on said valve member, whereby a grinding and polishing action occurs between said valve member and said seat.

7. A valve comprising a body portion having an inlet portion adapted to receive fluid under pressure and an outlet portion and having a truncated conical valve seat intermediate said inlet and outlet portions with the larger portion of the cone directed towards the inlet portion, a valve assembly including a valve stem and a metal valve member, a threaded connection between the stem and the body portion and the threads of said connection having clearance to allow axial motion of the stem without rotation and to allow lateral motion of the stem, said valve member being rigidly carried by the inner end of the stem, said valve member having a thin-walled, hollow, conical portion with its larger end opening into the inlet portion, said conical portion being flexible and freely conforming itself to the seat, said seat having a surface contact with said conical portion when the valve is closed, said conical portion when said valve is being closed first seating with a surface contact within the conical valve seat by fluid pressure and being rotated by said stem before the threads exert a closing force on said valve member, whereby a grinding and polishing action occurs between said valve member and said seat.

WARREN F. HEINEMAN.